(12) United States Patent
Shi et al.

(10) Patent No.: US 8,418,048 B2
(45) Date of Patent: Apr. 9, 2013

(54) DOCUMENT PROCESSING SYSTEM, DOCUMENT PROCESSING METHOD, COMPUTER READABLE MEDIUM AND DATA SIGNAL

(75) Inventors: Meng Shi, Kanagawa (JP); Taro Terao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1486 days.

(21) Appl. No.: 11/636,578

(22) Filed: Dec. 11, 2006

(65) Prior Publication Data
US 2007/0296695 A1 Dec. 27, 2007

(30) Foreign Application Priority Data
Jun. 27, 2006 (JP) .................................. 2006-177375

(51) Int. Cl.
*G06F 17/21* (2006.01)
(52) U.S. Cl.
USPC ........................................................ 715/201
(58) Field of Classification Search .................. 715/201
See application file for complete search history.

(56) References Cited

U.S. PATENT DOCUMENTS

| | | | | | |
|---|---|---|---|---|---|
| 5,511,148 | A | * | 4/1996 | Wellner | 715/201 |
| 5,732,227 | A | * | 3/1998 | Kuzunuki et al. | 715/775 |
| 5,778,352 | A | * | 7/1998 | Inoue et al. | 1/1 |
| 5,784,487 | A | * | 7/1998 | Cooperman | 382/175 |
| 5,821,929 | A | * | 10/1998 | Shimizu et al. | 382/190 |
| 5,841,900 | A | * | 11/1998 | Rahgozar et al. | 382/176 |
| 5,917,490 | A | * | 6/1999 | Kuzunuki et al. | 715/775 |
| 5,999,664 | A | * | 12/1999 | Mahoney et al. | 382/305 |
| 6,005,547 | A | * | 12/1999 | Newman et al. | 715/201 |
| 6,005,680 | A | * | 12/1999 | Luther et al. | 358/2.1 |
| 6,067,112 | A | * | 5/2000 | Wellner et al. | 348/211.4 |
| 6,128,102 | A | * | 10/2000 | Ota | 358/403 |
| 6,178,270 | B1 | * | 1/2001 | Taylor et al. | 382/284 |
| 6,266,057 | B1 | * | 7/2001 | Kuzunuki et al. | 715/205 |
| 6,297,804 | B1 | * | 10/2001 | Kashitani | 345/157 |
| 6,323,876 | B1 | * | 11/2001 | Rao et al. | 345/634 |
| 6,346,933 | B1 | * | 2/2002 | Lin | 345/157 |

(Continued)

FOREIGN PATENT DOCUMENTS

JP 06-110993 4/1994
JP A-07-168949 7/1995

(Continued)

OTHER PUBLICATIONS

Newman et al., A Desk Supporting Computer-Based Interaction With Paper Documents, 1992, ACM Conference on Human Factors in Computing Systems, pp. 587-592.*

(Continued)

*Primary Examiner* — Frank D Mills
(74) *Attorney, Agent, or Firm* — Oliff & Berridge, PLC

(57) ABSTRACT

A document processing system includes a first acquisition section, a storage section, a second acquisition section and a data processor. The first acquisition section acquires a position specified by a user in an actual document. The storage section stores layout data of the document and content data of the document associated with the layout data. The second acquisition section acquires data in the specified position from the content data of the document stored in the storage section, based on the layout data stored in the storage section and the specified position. The data processor processes the data acquired by the second acquisition section.

13 Claims, 5 Drawing Sheets

U.S. PATENT DOCUMENTS

| | | | |
|---|---|---|---|
| 6,408,257 B1 * | 6/2002 | Harrington et al. | 702/150 |
| 6,446,099 B1 * | 9/2002 | Peairs | 715/210 |
| 6,463,220 B1 * | 10/2002 | Dance et al. | 396/431 |
| 6,671,684 B1 * | 12/2003 | Hull et al. | 707/6 |
| 6,674,426 B1 * | 1/2004 | McGee et al. | 345/173 |
| 6,801,673 B2 * | 10/2004 | Chao et al. | 382/282 |
| 7,675,504 B1 * | 3/2010 | Smith et al. | 345/156 |
| 2001/0022575 A1 * | 9/2001 | Woflgang | 345/156 |
| 2001/0032057 A1 * | 10/2001 | Smith et al. | 702/94 |
| 2001/0044858 A1 * | 11/2001 | Rekimoto | 710/1 |
| 2002/0037104 A1 * | 3/2002 | Myers et al. | 382/187 |
| 2002/0041325 A1 * | 4/2002 | Maggioni | 348/14.16 |
| 2002/0126161 A1 * | 9/2002 | Kuzunuki et al. | 345/863 |
| 2003/0103238 A1 * | 6/2003 | MacLean et al. | 358/1.18 |
| 2003/0128875 A1 * | 7/2003 | Pilu et al. | 382/177 |
| 2003/0187886 A1 * | 10/2003 | Hull et al. | 707/203 |
| 2004/0032428 A1 * | 2/2004 | Pilu et al. | 345/764 |
| 2004/0220898 A1 * | 11/2004 | Eguchi et al. | 707/1 |
| 2004/0220962 A1 * | 11/2004 | Kaneda | 707/102 |
| 2005/0076295 A1 * | 4/2005 | Simske et al. | 715/517 |
| 2005/0128297 A1 * | 6/2005 | Katsuyama | 348/155 |
| 2005/0154980 A1 * | 7/2005 | Purvis et al. | 715/513 |
| 2005/0165747 A1 * | 7/2005 | Bargeron et al. | 707/3 |
| 2006/0072009 A1 * | 4/2006 | Moesgaard Kjeldsen et al. | 348/137 |
| 2006/0072830 A1 * | 4/2006 | Nagarajan et al. | 382/224 |
| 2006/0085477 A1 * | 4/2006 | Phillips et al. | 707/104.1 |
| 2006/0181518 A1 * | 8/2006 | Shen et al. | 345/173 |
| 2006/0181519 A1 * | 8/2006 | Vernier et al. | 345/173 |
| 2006/0285772 A1 * | 12/2006 | Hull et al. | 382/305 |
| 2007/0011140 A1 * | 1/2007 | King et al. | 707/3 |

FOREIGN PATENT DOCUMENTS

| | | |
|---|---|---|
| JP | A-09-134442 | 5/1997 |
| JP | A-09-319556 | 12/1997 |
| JP | 2001056837 A * | 2/2001 |
| JP | 2004-213518 | 7/2004 |

OTHER PUBLICATIONS

Hong et al., Advanced Paper Document in a Projection Display, Oct. 2004, Springer Berlin/Heidelberg, Lecture Notes in Computer Science vol. 3332, pp. 81-87.*

Rekimoto et al., Augmented Surfaces: A Spatially Continuous Work Space for Hybrid Computing Environments, 1999, ACM Conderence on Human Factors in Computing Systems, pp. 378-385.*

Koike et al., Integrating Paper and Digital Information on Enhanced Desk: A Method for Realtiem Finger Tracking on an Augmented Desk System, Dec. 2001, ACM Transactions on Computer-Human Interaction, vol. 8, No. 4, pp. 307-322.*

Wellner, Interacting With Paper on the Digital Desk, Jul. 1993, ACM Communication of the ACM vol. 35 No. 7, pp. 87-96.*

Robinson, et al., The Livepaper System: Augmenting Paper on an Enhanced Tabletop, 2001, Elsevier Science Ltd, Computer & Graphics 25, pp. 731-743.*

Office Action issued in JP Application No. 2006-177375 (with English translation).

* cited by examiner

| DOCUMENT ID | DOCUMENT DATA | LAYOUT DATA |
|---|---|---|
| 00123······876 | △△△. XXX | △△△. XXY |
| 012······5432 | △△○. XXX | △△○. XXY |
| 124······001 | △△□. XXX | △△□. XXY |

DOCUMENT PROCESSING SYSTEM, DOCUMENT PROCESSING METHOD, COMPUTER READABLE MEDIUM AND DATA SIGNAL

BACKGROUND

Technical Field

This invention relates to a document processing system, a document processing method, a computer readable medium and a data signal, and in particular to a user interface, which uses an actual document.

SUMMARY

According to an aspect of the invention, a document processing system includes a first acquisition section, a storage section, a second acquisition section and a data processor. The first acquisition section acquires a position specified by a user in an actual document. The storage section stores layout data of the document and content data of the document associated with the layout data. The second acquisition section acquires data in the specified position from the content data of the document stored in the storage section, based on the layout data stored in the storage section and the specified position. The data processor processes the data acquired by the second acquisition section.

BRIEF DESCRIPTION OF THE DRAWINGS

Exemplary embodiments of the invention will be described in detail below with reference to accompanying drawings wherein.

DETAILED DESCRIPTION

Exemplary embodiments of the invention will be discussed in detail based on the accompanying drawings.

First Exemplary Embodiment

Figure 1:
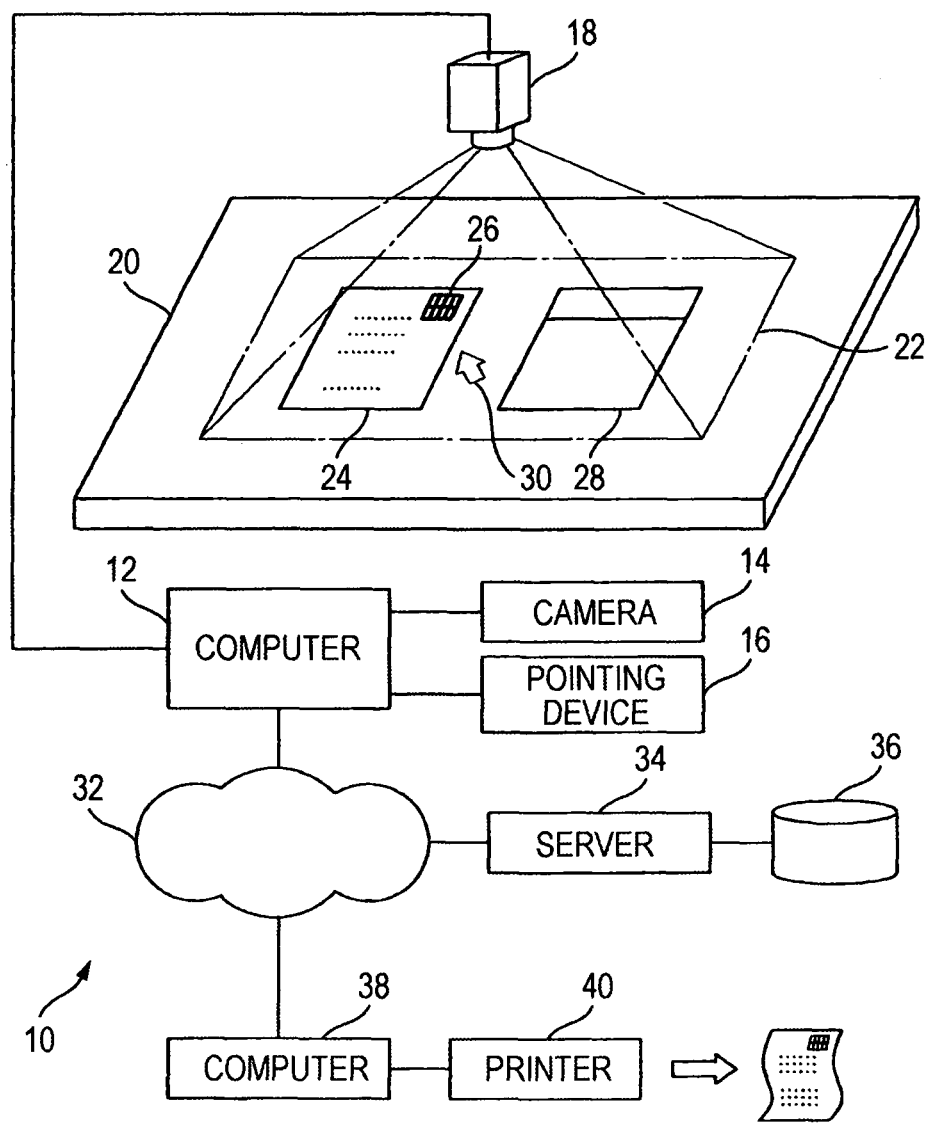
FIG. 1 is a drawing to show the general configuration of a document processing system according to an embodiment of the invention.

FIG. 1 is a drawing to show the general configuration of a document processing system 10 according to an exemplary embodiment of the invention. As shown in FIG. 1, in the document processing system 10, an actual document 24 on which a document and a pattern 26 are formed is placed on a projection table 20. A projector 18 is installed above the projection table 20 and projects an image concerning a program for document processing, specifically a program window 28, next to the actual document 24. That is, the actual document 24 is placed in a projection target region 22 of the projector 18, and the program window 28 is projected next to the actual document 24 in the projection target area 22. The projector 18 also projects a cursor image 30 indicating a position currently specified by a user (may be referred to as "user's specifying position") in the projection target region 22. The user can move the projection position of the cursor image 30 as desired with a pointing device 16 such as a mouse or a touch pad. Also, the user may specify a desired position on the actual document 24 with the cursor image 30, press a button provided in the pointing device 16 at that point, move the cursor image 30 into the region where the program window 28 is projected with keeping pressing the button and release the button. That is, the user may perform a so-called drag and drop operation to thereby pass data in the user's specifying position on the actual document 24 to the program for document processing. Accordingly, the program can use the passed data to perform various types of data processing.

To realize this function, the document processing system 10 includes a computer 12 to which the projector 18 is connected. A camera 14 and the pointing device 16 are also connected to the computer 12.

Figure 2:
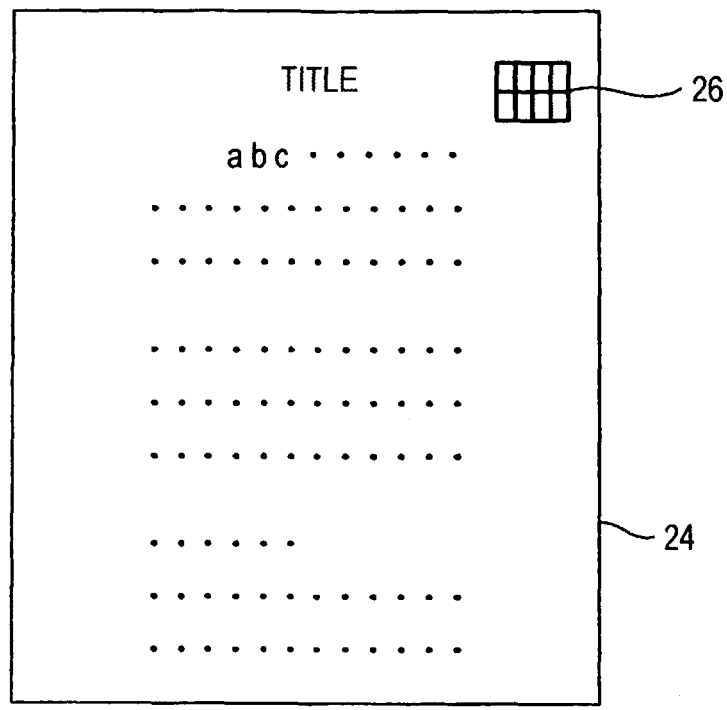
FIG. 2 is a drawing to show an example of an actual document.
Figure 3A:
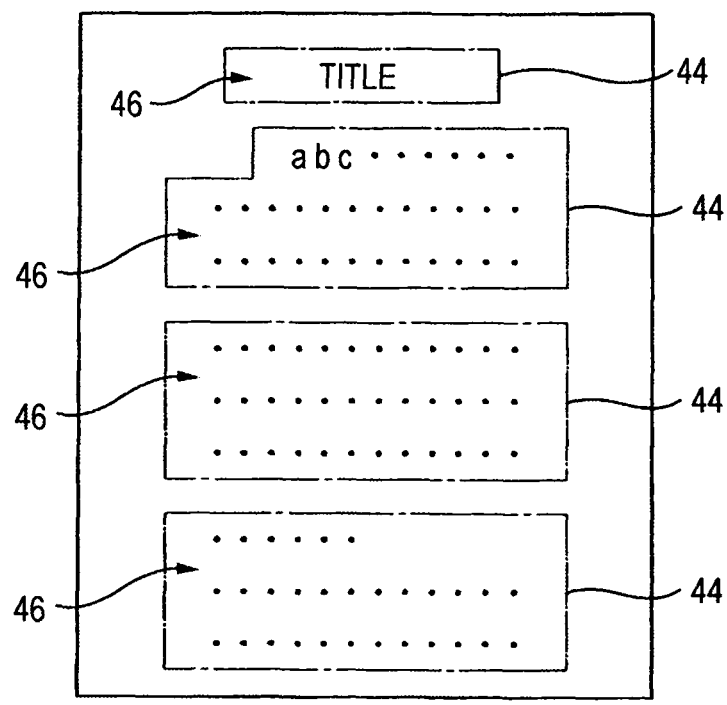
FIG. 3 is a drawing to schematically show the contents of document data and layout data.

The computer 12 is connected to a communication network 32 such as the Internet and can perform data communication with a server 34 connected to the communication network 32. Another computer 38 is also connected to the communication network 32 can also perform data communication with the server 34. The computer 38 is a computer for creating document data. The computer 38 includes a printer 40, which prints document data on a print medium such as a sheet of paper to prepare the actual document 24. When creating a document, the computer 38 generates identification information of the document, that is, document ID. The document ID may be a hash value generated based on the document data, for example. The computer 38 assigns to each document, information representing the document ID. Then, the printer 40 prints such information on the actual document 24. In the exemplary embodiment, a one-dimensional or two-dimensional bar code 26 is adopted as the information representing the document ID. The bar code 26 is printed in a corner of the actual document 24 as shown in FIG. 2. The document data generated by the computer 38 contains layout data 44 indicating layout of the document and content data 46 indicating descriptions to be formed at respective positions as shown in FIG. 3A.

Figure 3B:
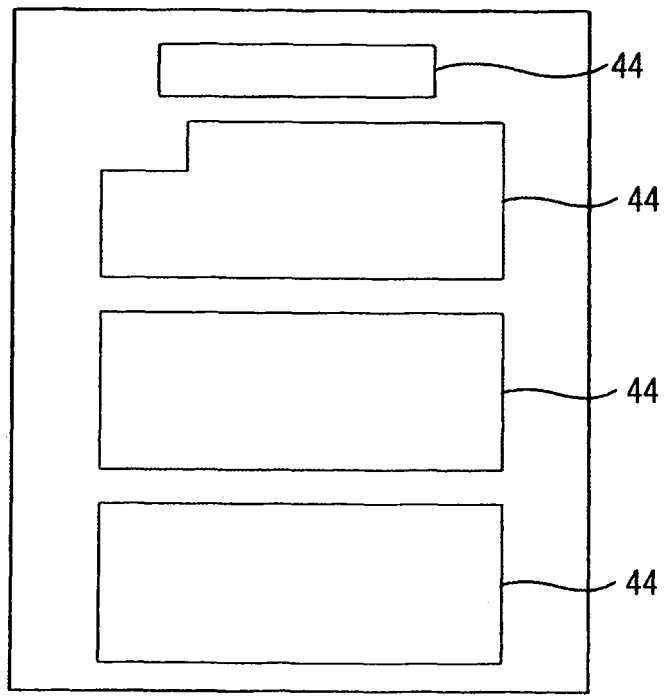
Figures 4, 5:
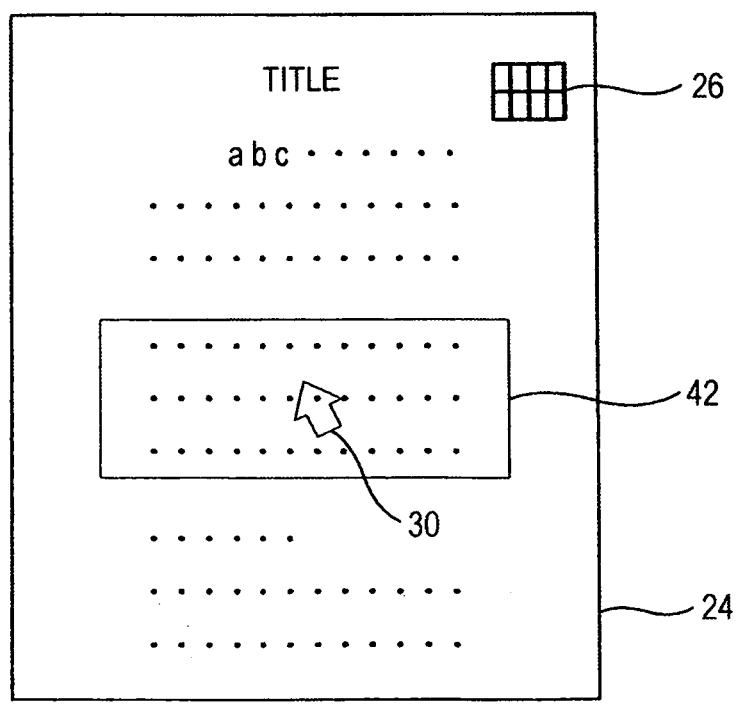
FIG. 4 is a drawing to schematically show the storage contents of a document database.
FIG. 5 is a drawing to show how an region identification image is projected onto an actual document.

When creating the document data, the computer 38 transmits the document data to the server 34 together with the document ID. Upon reception of the document data and the document ID from the computer 38, the server 34 registers them in a document database 36. In this case, the server 34 extracts the layout data 44 contained in the document data from the document data. FIG. 3B schematically shows the extracted layout data 44, which contains data indicating positions of regions where description is made (description regions) in the document. The server 34 stores the document ID, the document data identified by the document ID and the layout data 44 extracted from the document data in the document database 36 in association with each other, as shown in FIG. 4. Accordingly, using the document ID as a key, the document data and the layout data can be read from the document database 36.

When the user gets the actual document 24 printed out by the printer 40, the user captures the bar code 26 formed in the corner of the actual document 24 with the camera 14. The captured image of the bar code 26 is input to the computer 12. Then, the computer 12 generates the document ID represented by the captured image of the bar code 26. The computer 12 transmits the generated document ID to the server 34 through the communication network 32. The server 34 reads the layout data 44, which is associated with the received document ID, from the document database 36, and returns the read layout data 44 to the computer 12.

The computer 12 is configured to project a calibration image (not shown), which specifies a location at which the actual document 24 is to be placed, onto the projection target region 22. The calibration image may include four L-shaped images indicating positions to match the four corners of the actual document 24. The user places the actual document 24 at a predetermined position in the projection table 20 with relying on a position guide of the calibration image. The computer 12 retains data for specifying a region where the actual document 24 thus guided by the position guide is placed, that is, actual-document specifying data. Furthermore, the computer 12 manages the current position of the cursor image 30. The computer 12 a relative position of the current position of the cursor image 30 to the region specified by the actual-document specifying data, to thereby acquire which position in the actual document 24 the user specifies. The computer 12 determines which description region the user specifies, based on the acquired position and the layout data 44 received from the server 34. That is, the computer 12 determines which of one or more description regions specified by the layout data 44 the cursor image 30 is currently located in.

If the cursor image 30 is positioned in any of the description regions, the computer 12 causes the projector 18 to project an image, which identifies the description region (region identification image), onto the actual document 24. At this time, the projection position of the region identification image is adjusted so that description, which corresponds to a region identified by the region identification image and is formed on the actual document 24, is located in the region identified by the region identification image. FIG. 5 shows a state where when the cursor image 30 is projected in the position of one description on the actual document 24, a region identification image 42 identifying the region corresponding to the description is projected onto the actual document 24. Since the region identification image 42, which identifies the description region indicated by the cursor image 30, is projected onto the actual document 24, the user can intuitively grasp which description region a candidate for data processing is.

That is, if the user performs drag-and-drop operation of the pointing device 16 as described above in a state where any of description regions is indicated by the cursor image 30 and the region identification image 42 identifying the description region is projected onto the actual document 24, the already generated document ID is transmitted through the communication network 32 to the server 34 based on data, which specifies the indicated description region (description-region specifying data) and the bar code 26. The server 34 acquires data, which indicates the description in the description region specified by the received description-region specifying data from among the plural pieces of document data stored in the document database 36 in association with the received document ID. Then, the server 34 returns the acquired data to the computer 12. The data is passed as the processing target of the program relating to the program window 28. Thus, a program such as document processing executes data processing using the data received from the server 34.

Figure 6:
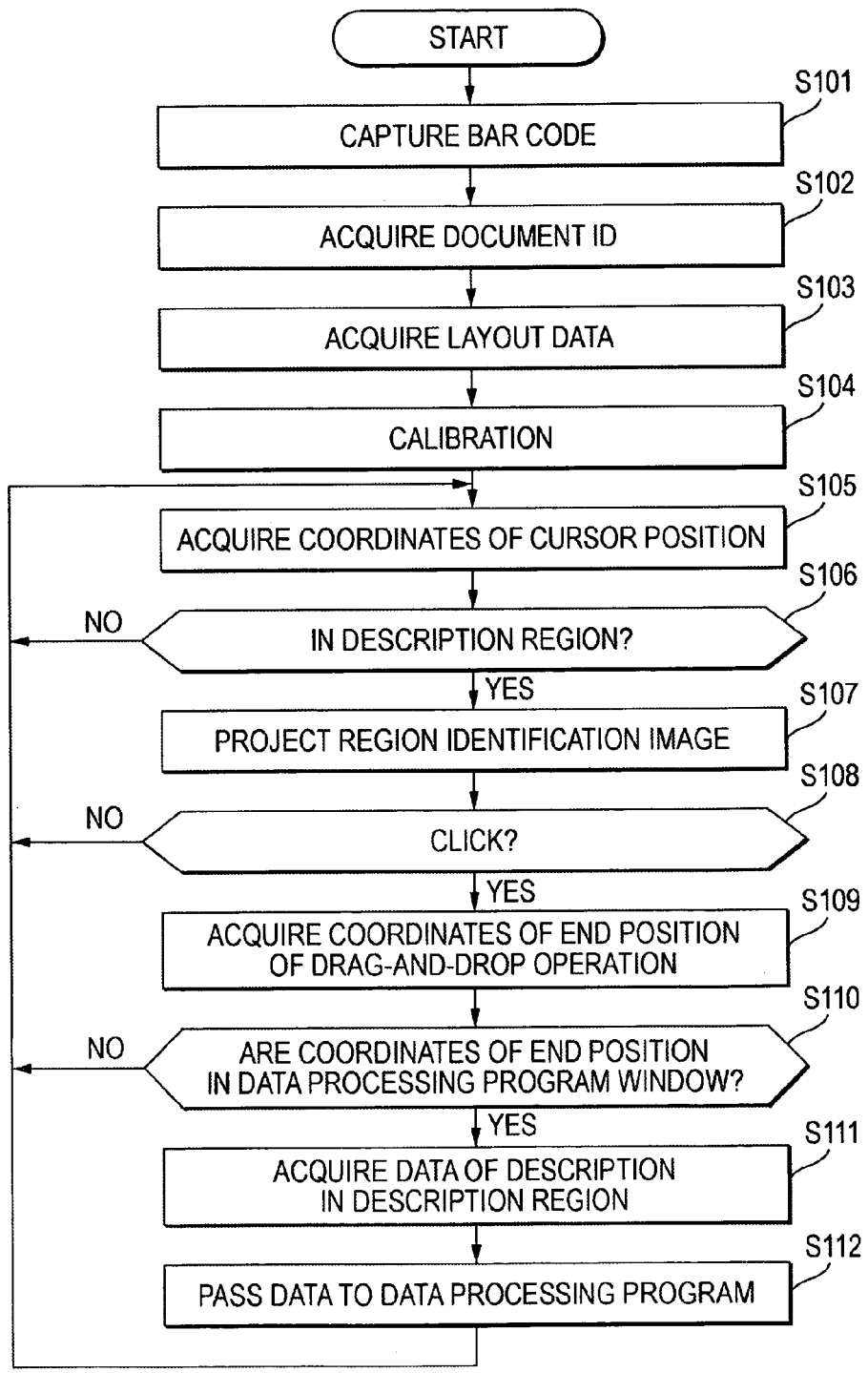
FIG. 6 is an operation flowchart of the document processing system.

FIG. 6 is an operation flowchart of the document processing system 10. The processing shown in FIG. 6 is implemented by the following manner. That is, the computer 12 executes a document processing program according to the exemplary embodiment. The program is stored in a computer-readable information storage medium such as a CD-ROM or a DVD-ROM, for example, and is installed in the computer 12 through the information storage medium or is downloaded to the computer 12 from any other computer through the communication network 32.

As shown in FIG. 6, in the document processing system 10, first a bar code 26 printed on an actual document 24 is captured with the camera 14 (S101). Next, the computer 12 generates the document ID from the captured image of the bar code 26 (S102). The computer 12 transmits the document ID thus generated to the server 34, and receives layout data 44 returned from the server 34 (S103). A calibration image is projected onto the projection target region 22 in accordance with the layout data 44. The user is guided so as to place the actual document 24 at a predetermined position of the projection table 20 (S104).

Thereafter, coordinates of the current position of the cursor image 30 are calculated in accordance with an output signal of the pointing device 16 (S105). It is determined whether or not the coordinates of the current position of the cursor image 30 are in any of description regions of the actual document 24 (S106). If the coordinates of the current position of the cursor image 30 are not in any of the description regions, the process returns to S105. On the other hand, if the coordinates of the current position of the cursor image 30 is in any of the description regions, the projector 18 projects a region identification image, which identifies the description region, onto the description region (S107). Further, it is determined whether or not the user clicks the pointing device 16 (S108). If the user does not click the pointing device 16, the process returns to S105. On the other hand, if the user clicks the pointing device 16, the coordinates of the current position of the cursor image 30 at the timing when the clicking is released, that is, when the user releases the button of the pointing device 16 are acquired as coordinates of an end position of the drag-and-drop operation (S109). It is determined whether or not the coordinates of the end position of the drag-and-drop operation are in the program window 28 (S110). If the coordinates of the end position of the drag-and-drop operation are not in the program window 28, the process returns to S105. On the other hand, if the coordinates of the end position of the drag-and-drop operation are in the program window 28, the description-region specifying data, which specifies the description region identified by the projected region identification image, is transmitted to the server 34. Then, the data of the description returned from the server 34 is received (S111). Processing of the received data is started by the program corresponding to the program window 28 (S112).

Various modified embodiments of the invention are possible. For example, when the data of the description determined by the description-region specifying data is read from the document database 36, the server 34 may record the fact in association with the user of the computer 12. In so doing, control of charging the user for acquiring the data of each description, etc., is made possible. As one of service cases utilized as a portal UI in the ubiquitous society, the user may use a multiple function machine installed in a convenience store to purchase the electronic version of any desired one of photos, text, etc., published in magazines and newspapers and transfer it to his or her own mobile machine.

Further, a display for displaying the processing result of the computer 12 on a display screen may be connected to the computer 12, the projector 18 may further project an image indicating the current user's specification position onto the projection target region, and if the specification position is placed out of a predetermined projection area, the window 28 may be displayed on the display screen of the display.

Further, data storage means may store the storage address of the content data in place of the content data and data acquisition means may acquire the data based on the content data from the storage means indicated by the storage address.

What is claimed is:

1. A document processing system comprising:
   a first acquisition section that acquires a position specified by a user in an actual document being derived from an electronic document;
   a storage section comprising a non-transitory computer readable medium that stores layout data of the electronic document and content data of the electronic document associated with the layout data;
   a second acquisition section that acquires data in the specified position from the content data of the electronic document stored in the storage section, based on the layout data stored in the storage section and the specified position;
   a data processor that processes the data acquired by the second acquisition section; and
   a projector that projects onto a projection target region i) an image concerning a computer program where the actual document is placed, ii) an image indicating the position currently specified by the user, and iii) a region identification image that identifies a region specified by the position currently specified by the user, wherein
   the data processor processes the data acquired by the second acquisition section in accordance with the computer program based on a drag-and-drop command entered by the user, the drag-and-drop command relating to the image concerning the computer program.

2. The system according to claim 1, wherein the image concerning the computer program is at least one of (i) an image for operation command entry containing a menu relating to an application software, which serves as a computer program, and (ii) an image indicating a region where processing content is displayed.

3. The system according to claim 2, wherein:
   the region where the processing content is displayed is a window, and
   the data processor displays processing result data in the window through the projector.

4. The system according to claim 1, further comprising:
   a display, wherein;
   if the specified position is placed out of a predetermined projection region, the data processor displays the processing result on the display screen of the display.

5. The system according to claim 1, further comprising:
   a logging section, wherein if second acquisition section acquires the data, the logging section logs information concerning the data acquired by the second acquisition section as a history.

6. The system according to claim 1, wherein:
   the storage section stores a storage address of the content data in place of the content data, and
   the second acquisition section acquires the data based on the content data from the storage section indicated by the storage address.

7. The system according to claim 1, wherein:
   the document includes one or more partial regions each containing content,
   when the image indicating the position specified by the user is projected onto any of the partial areas, the projector projects the region identification image, which identifies the partial area, onto the projection target region based on the layout data, and
   the second acquisition section acquires the data of the content contained in the partial area identified by the region identification image from the content data stored in the storage section.

8. The system according to claim 1, wherein:
   identification information, which identifies the document, is recorded in the actual document,
   the system further comprising:
   a document specifying section that specifies the document based on the identification information recorded in the actual document, wherein:
   the second acquisition section acquires the data in the position specified by the user from the content data of the specified document based on the layout data of the specified document and the position specified by the user.

9. The system according to claim 1, wherein the layout data of the electronic document includes positional data including coordinates indicating positions of passages of text identified by region identification images where content is made in the electronic document, and the content data includes text contained within the passages.

10. A document processing method comprising:
    acquiring a position specified by a user in an actual document;
    acquiring data in the specified position from content data of the document associated with layout data stored in a storage section, based on the layout data of the document stored in the storage section and the specified position;
    projecting onto a projection target region i) an image concerning a computer program where the actual document is placed, ii) an image indicating the position currently specified by the user, and iii) a region identification image that identifies a region specified by the position currently specified by the user; and
    processing the acquired data in accordance with the computer program based on a drag-and-drop command entered by the user, the drag-and-drop command relating to the image concerning the computer program.

11. The method according to claim 10, wherein the layout data of the electronic document includes positional data including coordinates indicating positions of passages of text identified by region identification images where content is made in the electronic document, and the content data includes text contained within the passages.

12. A non-transitory computer readable medium storing a program causing a computer to execute document processing, the document processing comprising:
    acquiring a position specified by a user in an actual document being derived from an electronic document;
    storing layout data of the electronic document and content data of the electronic document associated with the layout data;
    acquiring data in the specified position from the stored content data of the electronic document based on the stored layout data;
    projecting onto a projection target region i) an image concerning a computer program where the actual document is placed, ii) an image indicating the position currently specified by the user, and iii) a region identification image that identifies a region specified by the position currently specified by the user; and
    processing the acquired data in accordance with the computer program based on a drag-and-drop command entered by the user, the drag-and-drop command relating to the image concerning the computer program.

13. The non-transitory computer readable medium according to claim 12, wherein the layout data of the electronic document includes positional data including coordinates indicating positions of passages of text identified by region identification images where content is made in the electronic document, and the content data includes text contained within the passages.

\* \* \* \* \*